(12) United States Patent
Hill et al.

(10) Patent No.: US 6,243,002 B1
(45) Date of Patent: Jun. 5, 2001

(54) TUNNEL SENSOR

(75) Inventors: Jonathan W. Hill, Scarborough, ME (US); Jurgen Dorschky, St. Mery (FR); Mark Cote, Springvale; Damon F. Gentile, Windham, both of ME (US)

(73) Assignee: Control Devices, Standish, ME (US)

( * ) Notice: Subject to any disclaimer, the term of this patent is extended or adjusted under 35 U.S.C. 154(b) by 0 days.

(21) Appl. No.: 09/269,701

(22) PCT Filed: Nov. 17, 1998

(86) PCT No.: PCT/US98/24517
§ 371 Date: Mar. 31, 1999
§ 102(e) Date: Mar. 31, 1999

(87) PCT Pub. No.: WO99/25584
PCT Pub. Date: May 27, 1999

Related U.S. Application Data

(60) Provisional application No. 60/076,854, filed on Mar. 5, 1998, and provisional application No. 60/065,987, filed on Nov. 17, 1997.

(51) Int. Cl.[7] .................................................. B06Q 1/00
(52) U.S. Cl. ...................... 340/425.5; 340/469; 250/200; 250/201.1; 307/10.1
(58) Field of Search ................................. 340/425.5, 469, 340/468, 458, 600; 250/200, 201.1, 226; 356/218, 222; 315/82, 77; 307/9.1, 10.1

(56) References Cited

U.S. PATENT DOCUMENTS

| | | | |
|---|---|---|---|
| 3,925,244 * | 12/1975 | Nagasawa et al. | 250/372 |
| 4,045,769 * | 8/1977 | Faller | 340/469 |
| 4,249,160 | 2/1981 | Chilvers | 340/33 |
| 4,629,941 | 12/1986 | Ellis et al. | 315/153 |
| 4,645,975 | 2/1987 | Meitzler et al. | 315/82 |
| 4,933,550 | 6/1990 | Hegyi | 250/237 R |
| 5,029,276 | 7/1991 | Buehler et al. | 250/208.2 |
| 5,036,437 | 7/1991 | Macks | 362/61 |
| 5,072,106 | 12/1991 | Osawa | 250/206 |
| 5,117,744 | 6/1992 | Zimmer et al. | 454/75 |
| 5,162,643 | 11/1992 | Currie | 250/206.1 |
| 5,182,502 | 1/1993 | Slotkowski et al. | 315/159 |
| 5,193,894 | 3/1993 | Lietar et al. | 362/66 |
| 5,235,178 | 8/1993 | Hegyi | 250/226 |
| 5,264,691 | 11/1993 | Hegyi | 250/203.4 |
| 5,331,251 | 7/1994 | Marois | 315/82 |
| 5,349,267 | 9/1994 | Brassier et al. | 315/82 |

(List continued on next page.)

FOREIGN PATENT DOCUMENTS

| | | |
|---|---|---|
| 38 21 743 A1 | 1/1990 | (DE) . |
| 42 06 142 A1 | 9/1993 | (DE) . |
| 42 15 940 A1 | 11/1993 | (DE) . |
| 43 29 983 A1 | 3/1995 | (DE) . |
| 195 23 262 A1 | 1/1997 | (DE) . |
| 0 529 346 B1 | 3/1993 | (EP) . |
| 2 736 016 | 1/1997 | (FR) . |

Primary Examiner—Jeffery Hofsass
Assistant Examiner—Sihong Huang
(74) Attorney, Agent, or Firm—Woodard, Emhardt, Naughton, Moriarty & McNett

(57) ABSTRACT

A sensor (20, 100, 200, 300) for detecting the approach and exit of a vehicle (42) to a tunnel (46). In one embodiment there is a sensor (20, 100, 200, 300) with a photodiode (22*a*) that receives light through an inclined channel (30, 30') or aperture (32, 332, 432). The channel provides a field of view (44, 344, 31) ahead and above the vehicle. The photosensor (22*a*) is thus sensitive to the change in light from this field of view (44, 344, 31) as a vehicle enters (46*a*) and exits (46*b*) a tunnel (46). Some embodiments of the present invention include a second photosensor (22*b*) with a wider field of view (112, 112", 111) for detecting ambient light.

91 Claims, 10 Drawing Sheets

U.S. PATENT DOCUMENTS

| | | | |
|---|---|---|---|
| 5,352,886 | 10/1994 | Kane | 260/216 |
| 5,416,318 * | 5/1995 | Hegyi | 250/226 |
| 5,426,294 | 6/1995 | Kobayashi et al. | 250/226 |
| 5,451,822 | 9/1995 | Bechtel et al. | 307/9.1 |
| 5,453,662 | 9/1995 | Gottlieb | 315/82 |
| 5,469,340 | 11/1995 | Heizmann | 362/66 |
| 5,473,515 | 12/1995 | Liu | 362/80.1 |
| 5,483,060 | 1/1996 | Sugiura et al. | 250/237 R |
| 5,499,168 | 3/1996 | Cochard et al. | 362/71 |
| 5,510,983 | 4/1996 | Iino | 364/424.01 |
| 5,517,020 | 5/1996 | Lamo | 250/214 AL |
| 5,562,336 | 10/1996 | Gotou | 362/37 |
| 5,592,146 | 1/1997 | Kover, Jr. | 340/468 |
| 5,602,384 | 2/1997 | Nunogaki et al. | 250/203.4 |
| 5,617,112 * | 4/1997 | Yoshida et al. | 345/102 |
| 5,625,182 | 4/1997 | Guenter | 250/229 |
| 5,633,710 | 5/1997 | Kumra et al. | 356/139.08 |
| 5,645,338 | 7/1997 | Kobayashi | 362/61 |
| 5,655,832 | 8/1997 | Pelka et al. | 362/296 |
| 5,660,454 | 8/1997 | Mori et al. | 362/61 |
| 5,676,453 | 10/1997 | Parkyn, Jr. et al. | 362/260 |
| 5,715,093 * | 2/1998 | Schierbeek et al. | 359/601 |
| 5,726,441 | 3/1998 | Samukawa et al. | 250/214.1 |
| 5,812,321 * | 9/1998 | Schierbeek et al. | 359/601 |

* cited by examiner

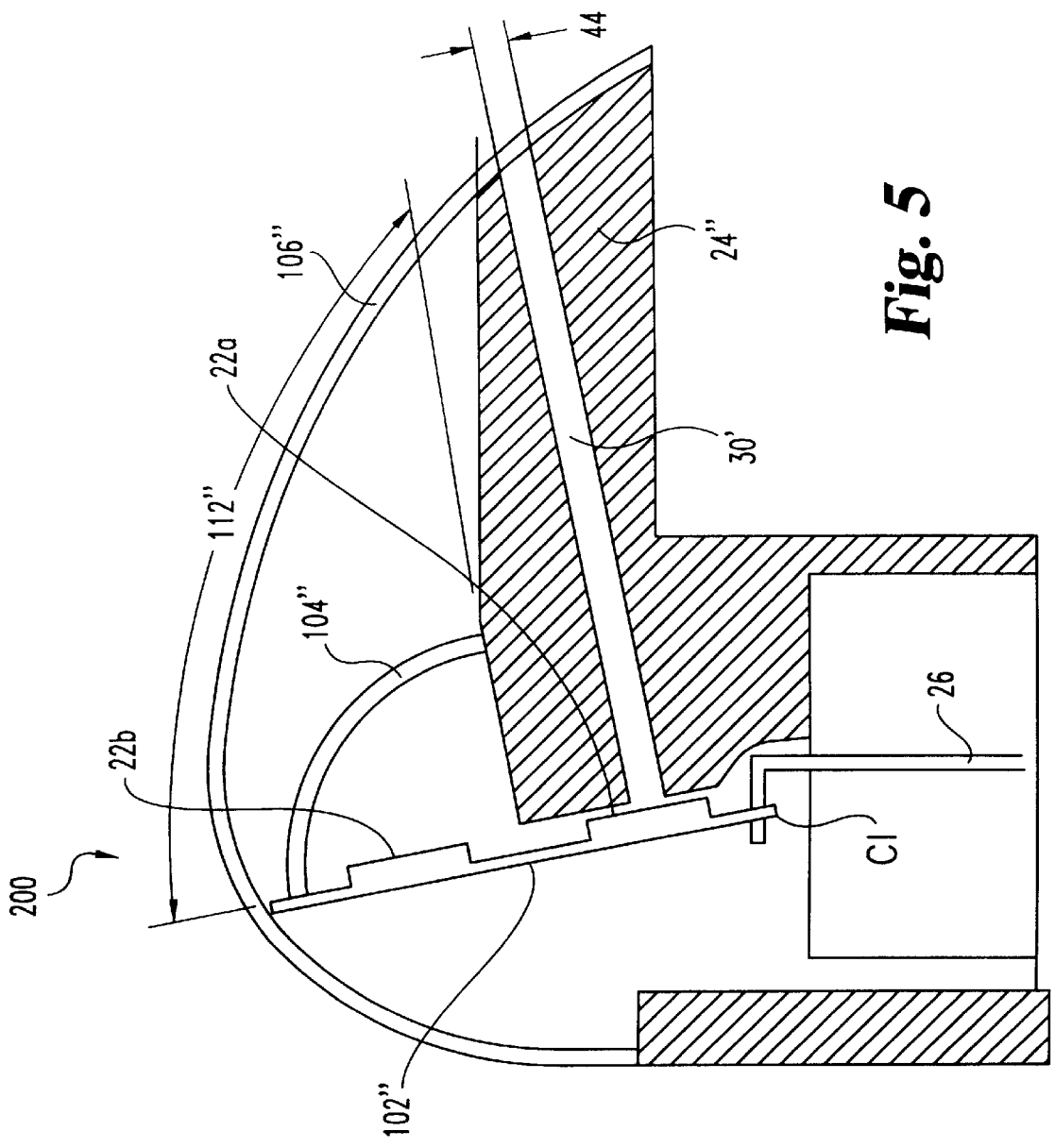

TUNNEL SENSOR

CROSS REFERENCE TO RELATED APPLICATIONS

This application claims priority to U.S. Provisional Patent Application No. 60/065,987, filed Nov. 17, 1997, and to U.S. Provisional Patent Application No. 60/076,854, filed Mar. 5, 1998. This applicationm incorporates herein by reference both of these provisional applications in their entirety.

BACKGROUND OF THE INVENTION

The present invention relates to an apparatus for detecting a tunnel. More specifically, the apparatus relates to a photosensor for a vehicle for detecting a tunnel.

Many vehicles include light sensors that actuate various systems of a vehicle based upon ambient light conditions. For example, some sensors provide a signal that changes state as a result of the general level of ambient light. A controller receiving this signal actuates the headlights on when the light level is low and off when the light level is high. However, these sensors necessarily include sufficient filtering of the photosensor electrical signal and/or the response of the controller so as to not be sensitive to brief disturbances in ambient light, such as shadows. Further, these sensors often include a rather wide field of view and include light from ahead, behind, to either side, and from above the vehicle.

Yet another driving situation in which consumers find it desirable to actuate the headlights is the situation presented by the vehicle approaching, within, and exiting a tunnel. Many drivers prefer to have their lights on when inside the tunnel and then turn the lights off as the tunnel is exited. Conventional ambient light sensors have difficulty responding to tunnels. The broad collection of light by such conventional sensors makes them unresponsive to the tunnel until after the tunnel has been entered. Further, those sensors incorporating low pass filtering or other time delays do not turn the headlights on until after the vehicle is well within the tunnel.

What is needed is a tunnel sensor that overcomes the disadvantages of conventional sensors. The present invention does this in a novel and unobvious way.

SUMMARY OF THE INVENTION

One aspect of the present invention concerns an apparatus comprising a photosensor, a housing, and a channel defined within the housing. The photosensor senses ambient light. The channel is generally inclined above the horizontal.

A different aspect of the present invention concerns a vehicle, such as a truck, bus, automobile, or motorcycle, and a housing mounted on said vehicle. First and second apertures are defined within the housing. A photosensor receives ambient light from the second aperture. There is also a channel defined within the housing for transmitting light to the photosensor. A portion of the first aperture is above the second aperture. The channel provides a field of view to the photosensor that is above and ahead of the vehicle.

A different aspect of the present invention concerns an apparatus for detecting a tunnel over a vehicle roadway. The method includes providing a channel in optical communication with a photosensor. The channel is oriented such that a portion of the channel generally faces ahead of the vehicle and generally faces above the vehicle. Light is permitted to enter the channel and fall incident upon the photosensor. A change in the electrical characteristics of the photosensor is measured when the vehicle approaches a tunnel.

In a different aspect of the present invention, there is an apparatus for a vehicle for sensing ambient light The apparatus includes a housing. There is also a first photosensor with a first electrical characteristic and a second photosensor with a second electrical characteristic. There is a channel defined within the housing for providing ambient light and a first field of view to the first photosensor. The second photosensor is provided ambient light from a second field of view that is wider than the first field of view.

In a different aspect of the present invention, there is an apparatus for detecting a tunnel over a roadway. The apparatus includes a vehicle for travelling on the roadway. A housing is mounted on the vehicle. There is also a photosensor for sensing ambient light, the photosensor providing a changeable electrical signal. A channel is defined within the housing for providing light to the photosensor. The channel is constructed and arranged such that the electrical signal changes in response to the vehicle approaching a tunnel.

In a different aspect of the present invention, there is a vehicle with an actuatable air conditioning system or actuatable headlights. There is a housing mounted on the vehicle. The apparatus includes a first photosensor providing a first electrical signal. There is a channel defined within the housing for providing ambient light in a first field of view to the first photosensor, the first field of view being generally above and ahead of the vehicle. The apparatus includes a controller for actuating the air conditioning system and/or the headlights. The controller receiving the first electrical signal and actuating said air conditioning system and/or said headlights in response thereto.

In a different aspect of the present invention there is an apparatus which includes a vehicle having a front and a rear. A housing is mounted on the vehicle. There is an aperture defined within the housing. The apparatus also includes a photosensor receiving ambient light from the aperture, the photosensor being mounted rearward of the aperture. The aperture provides a field of view to the photosensor that is above and ahead of the vehicle.

A different aspect of the present invention concerns a method for detecting a tunnel over a vehicle roadway. The method includes providing an aperture an optical communication with a photosensor, the aperture being within a housing mounted on a vehicle. The aperture is oriented in front of the photosensor such that the aperture provides a field of view to the photosensor that generally faces ahead of the vehicle and generally faces above the vehicle. Light is permitted to enter the aperture and fall incident upon the photosensor. A change is measured in the electrical characteristics of the photosensor when the vehicle approaches a tunnel.

Other aspects of the present invention will be apparent from the description of preferred embodiment, the claims, and the drawings to follow.

DESCRIPTION OF THE DRAWINGS

FIG. 5 is a cross-sectional schematic of another embodiment of the present invention.

DESCRIPTION OF THE PREFERRED EMBODIMENT

Figure 1A:
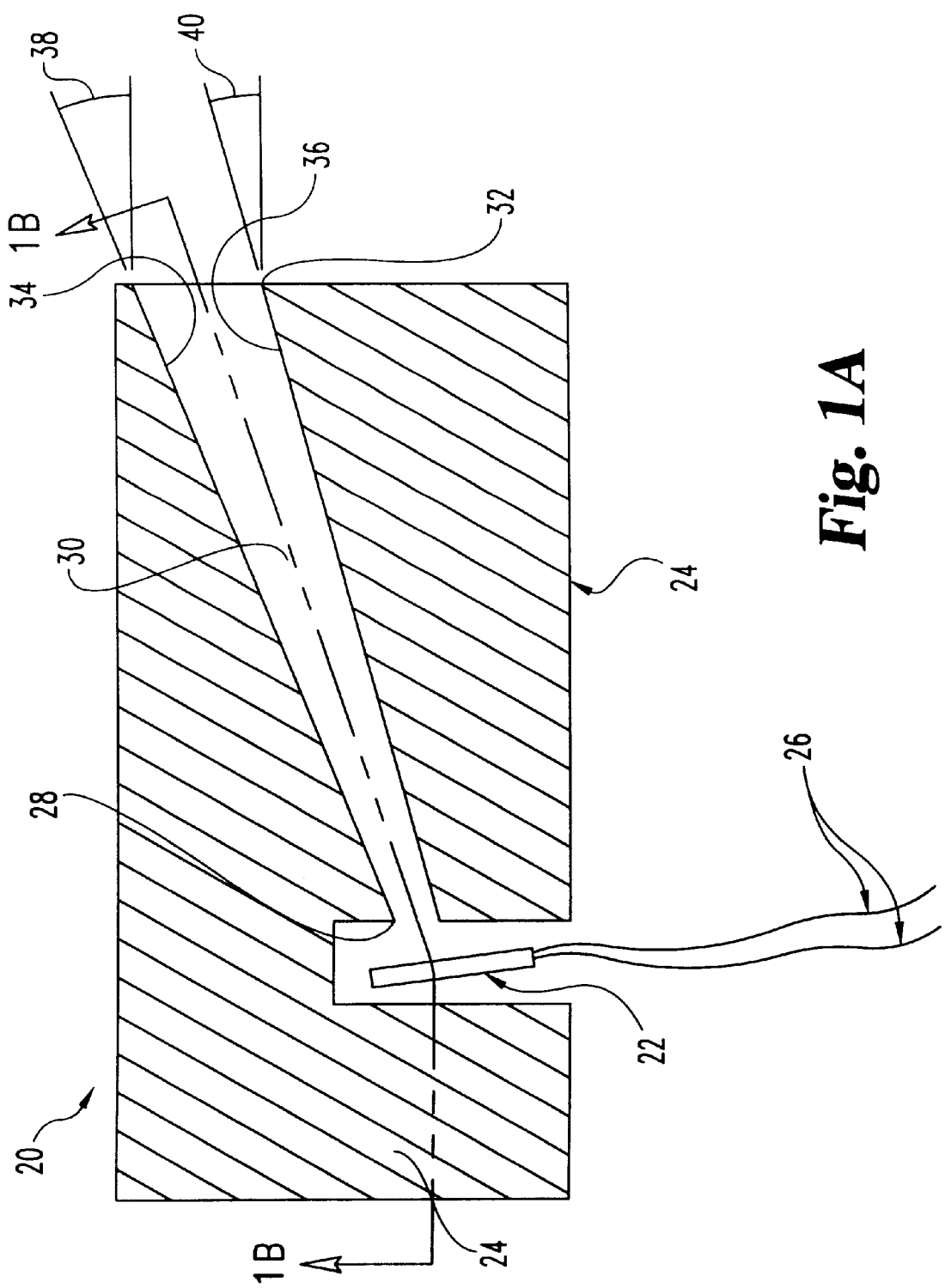
FIG. 1A is a cross-sectional schematic of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

This application claims priority to U.S. Provisional Patent Application No. 60/065,987, filed Nov. 17, 1997, and to U.S. Provisional Patent Application No. 60/076,854, filed Mar. 5, 1998. This applicationm incorporates herein by reference both of these provisional applications in their entirety.

The present invention relates to a sensor for a vehicle. The sensor provides an electrical output signal that changes dependent upon whether the vehicle is approaching, within, or exiting a tunnel. The electrical signal is provided to a controller that changes the state of a system of the vehicle. For example, if the vehicle is approaching a tunnel, the controller turns on the headlights of the vehicle preferably at or before the tunnel entrance and turns off the headlights at or near the tunnel exit. As another example, another controller can change the vehicle air conditioning to a recirculation mode within the tunnel so as to minimize the ingestion of polluted air within the vehicle. Those of ordinary skill in the art will recognize the application of the signals from a tunnel sensor to control other vehicle systems that it is desirable to actuate as a result of the vehicle entering a tunnel.

The present invention includes a photodiode that receives ambient light through a channel and/or aperture defined within a housing. The channel or aperture has a preferably forward-facing field of view that is inclined relative to the horizontal such that the photodiode receives light from above and ahead of the vehicle. The field of view of the photodiode is restricted so as to minimize light reaching the vehicle from directly above, behind, or from the sides of the vehicle. In other embodiments, the present invention includes a second photosensor with a field of view wider than that of the first photosensor. The second photosensor preferably receives light from areas surrounding the vehicle, and not just the area in front and ahead of the vehicle, as is the case with the first photosensor. The term horizontal as used herein generally refers to a plane defined by the roadway.

From a standpoint of cost and simplicity, it is preferable to have the tunnel sensor viewing aperture located in front of the photodiode, with the radiation sensitive receiving of the photodiode facing toward the forward portion of the vehicle. However, those of ordinary skill in the art will recognize other photodiode placements and orientations that permit the photodiode to see an inclined forward view suitable for detecting tunnels. For example, radiation received through the aperture could be transmitted into a polished chamber which would reflect the radiation onto a photodiode in any orientation.

FIG. 1a is a cross-sectional schematic of a first embodiment of the present invention. Apparatus 20 includes a photosensor 22 within a housing 24. Photosensor 22 may be of any type of sensor which has an electrical characteristic in proportion to the incident of light upon the photosensor. In one embodiment of the present invention photosensor 22 is a silicon photodiode. Those of ordinary skill in the art will recognize that other types of photosensors, including GAsP and GAP photodiodes, are also useful with the present invention One or more electrical wires 26 provide an indication of the change of characteristics in photosensor 22 preferably to a circuit (not shown) that controls a system of a vehicle. The circuit may include a buffer amplifier, low pass filter, and a microprocessor. The circuit may be a combination of analog and digital components.

Photosensor 22 receives ambient light from a nearby aperture 28 defined in housing 24. Aperture 28 is at one end of a pathway or channel 30 defined within housing 24. There is another aperture or opening 32 on the other end of channel 30 that permits ambient light to enter opening 32, travel through passageway 30, pass through aperture 28, and fall incident upon photosensor 22. Housing 24 is constructed from a material that is substantially opaque so as to only permit light entering pathway 30 to fall incident upon photosensor 22. Although housing 24 is depicted as being constructed from a single piece, those of ordinary skill in the art will recognize that housing 24 can also be fabricated from multiple pieces.

Channel 30 includes an upper wall 34 and a lower wall 36. Upper wall 34 is preferably inclined relative to the horizontal as indicated by angle 38. Angle 38 is less than about 65 degrees. Lower wall 36 is preferably inclined relative to the horizontal as indicated by angle 40. Angle 40 is more than about two degrees above the horizontal. Although FIG. 1 indicates a channel 30 in which walls 34 and 36 are angled relative to each other, the present invention also contemplates a pathway 30 with parallel walls, and also contemplates cylindrical pathways and conical pathways. Pathway 30 thus provides an inclined field of view between walls 34 and 36 for photosensor 22. Housing 24 and channel 30 are positioned within the vehicle such that photosensor 22 is provided a field of view through channel 30 that is generally above and ahead of the vehicle, so as to detect the change in light as a tunnel threshold passes through the field of view.

Figure 1B:
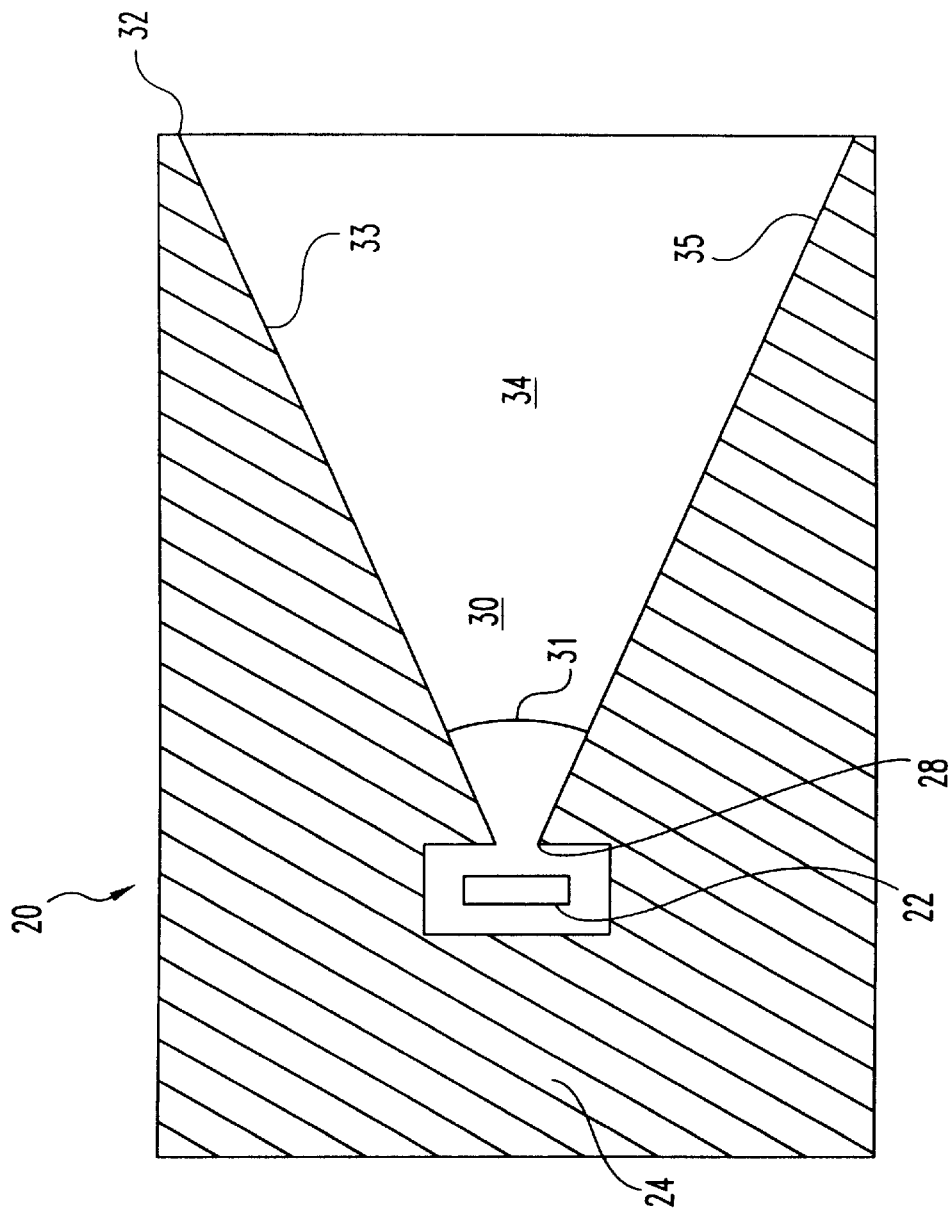
FIG. 1B is a cross-sectional schematic of the apparatus of FIG. 1A as taken along line 1B—1B of FIG. 1A.
Figure 2B:
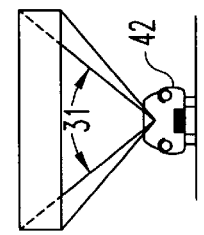
FIG. 2b is a front elevational view of a vehicle incorporating one embodiment of the present invention.
Figure 2A:
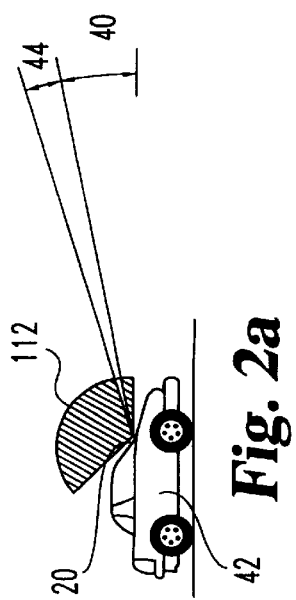
FIG. 2a is a side view of a vehicle incorporating one embodiment of the present invention.

Photosensor 22 is in optical communication with pathway 30 and receives incident radiation from a vertical field of view 44 which is inclined upward as best seen in FIG. 2A. Referring again to FIG. 1A, A portion of aperture 32 is located above aperture 28. Although the embodiment depicted in FIG. 1 shows aperture 32 being larger than aperture 28, the present invention also contemplates apertures 32 and 28 being equal in size, and also embodiments in which aperture 28 is larger than aperture 32.

FIG. 1B is a cross-sectional schematic of the apparatus of FIG. 1a as taken along line 1B—1B of FIG. 1A. Channel 30 preferably includes first sidewall 33 and a second sidewall 35. Sidewalls 33 and 35 define an included angle 31a between them. This angle is preferably between about 2 degrees to about 90 degrees. Preferably angle 31 is about 40 degrees. Sidewalls 33 and 35 provide a horizontal field of view 31b to sensor 22 that is wide enough so as to see around dark objects, such as the back of a truck in front of vehicle 42, that would otherwise obscure the view of sensor 22 and have the same effect as entering a tunnel.

As shown in FIG. 2b, field of view 31b is preferably centered about the center line of vehicle 42. However, the present invention also contemplates those embodiments in which field of view 31b is biased toward the left or the right of the vehicle. In some embodiments of the present invention field of view 31b is biased to look toward the area ahead and left of the vehicle, accounting for the vehicle entering a tunnel toward the right side of the tunnel. In other embodiments of the present invention angle 31 is biased to look toward the area ahead and right of the vehicle, accounting for the vehicle entering the tunnel toward the left side of the tunnel.

FIG. 2A is a side view of a vehicle incorporating one embodiment of the present invention. Apparatus 20 is preferably mounted on the dashboard of a vehicle 42 or near the rearview mirror mount. Although vehicle is shown represented as a car, the present invention is also useful on trucks, busses, motorcycles, and other vehicles. Apparatus 20 is oriented such that pathway 30 generally faces toward the front of the vehicle and generally faces above the vehicle. Field of view 44 is shown inclined above the horizontal by angle 40.

Figure 3:
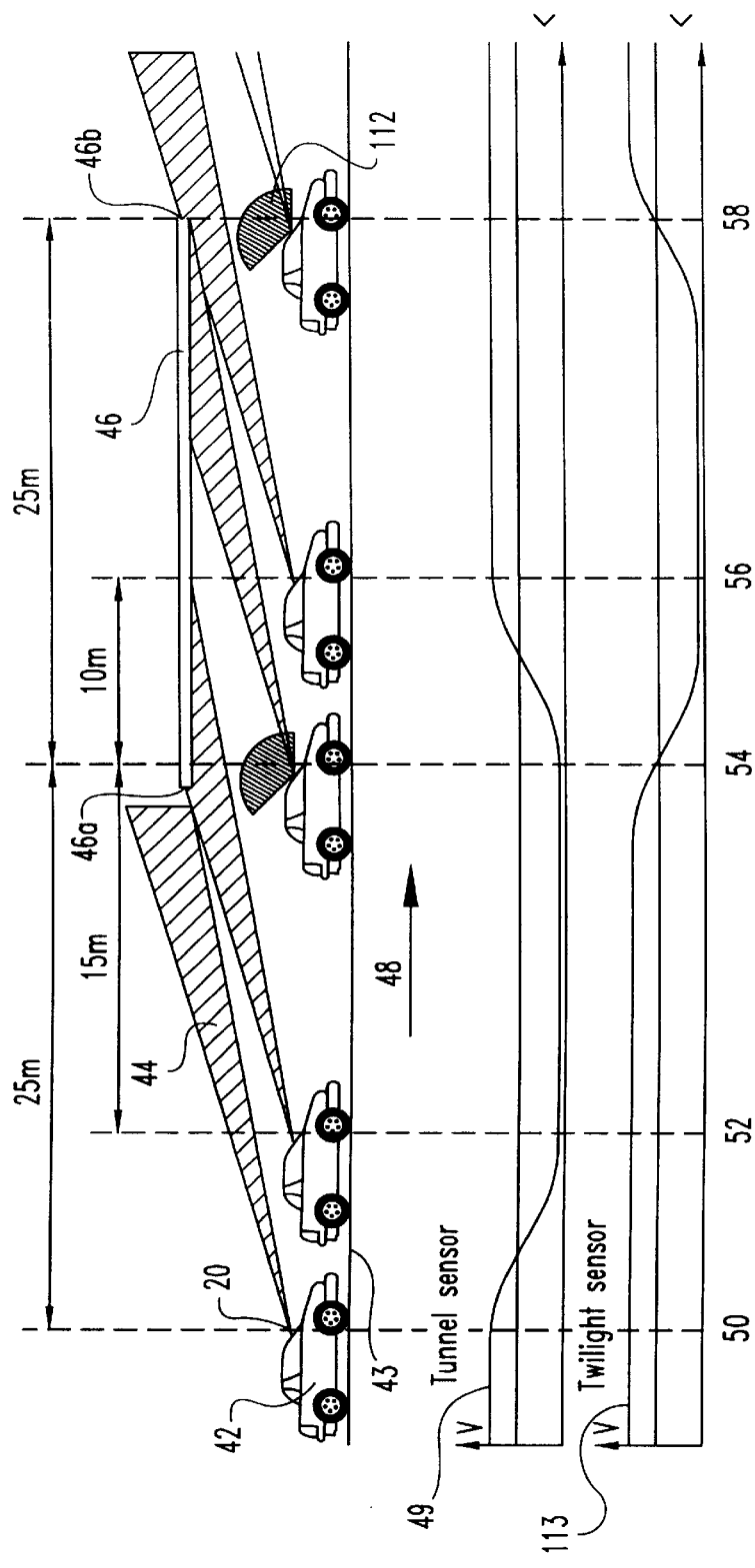
FIG. 3 is a pictorial representation of a vehicle incorporating one embodiment of the present invention approaching, inside, and exiting a tunnel.

FIG. 3 is a pictorial representation of a vehicle incorporating one embodiment of the present invention approaching, inside, and exiting a tunnel. Vehicle 42 incorporating apparatus 20 is shown at position 50 about 25 meters from entrance 46a of a tunnel 46. When vehicle 42 is at position 50, electrical signal characteristic 49 of photosensor 22 does not indicate that the vehicle is approaching a tunnel. Field view 44 receives ambient light directly from the sky, or indirectly, such as from the surface of a hill or mountain. As vehicle 42 continues travelling along pathway 43 in direction 48 and reaches point 52, which is about 15 meters from entrance 46a of tunnel 46, electrical characteristic 49 changes state, indicating that vehicle 42 is approaching entrance 46a of tunnel 46. This change in characteristic 49 is measured by the circuit previously described. When vehicle 42 is at position 52, field of view 44 is substantially filled by the upper surface of tunnel 46.

As vehicle 42 continues in direction 48 and approaches position 54 and crosses entrance 46a of tunnel 46, field of view 44 continues to see generally the upper surface of tunnel 46, and electrical characteristic 49 remains in the changed state. As vehicle 42 approaches point 56 about 15 meters from exit 46b of tunnel 46 along pathway 43 field of view 44 begins to include portions of the sky outside of tunnel 46. In response to the change in ambient light within field of view 44, electrical characteristic 49 changes back to the state indicating that vehicle 42 is not within a tunnel. In some embodiments of the present invention, the headlights are turned off as the vehicle crosses exit 46b. Although specific distances have been shown and described, those of ordinary skill in the art will recognize that by appropriate changes in the inclination of pathway 30, or the amplification applied to characteristic 49, or by means of appropriate filtering of characteristic 49, the present invention can be made to turn headlights on and off at a variety of distances relative to the thresholds of tunnel 46, entrance 46a and exit 46b.

One embodiment of the present invention includes an electrical circuit that measures the change in electrical characteristics of the photosensor when the vehicle approaches a tunnel and when a vehicle leaves a tunnel. In this embodiment the electrical circuit would turn on the headlights of vehicle 42 at about point 52 where field of view 44 begins to be substantially filled with the upper surface of tunnel 46. The headlights of vehicle 42 would thus be turned on prior to the entrance into tunnel 46. Also, the electrical circuit can incorporate a filter or a delay such that the headlights remain on even though electrical characteristic 49 has changed state at point 56, at which point field of view 44 begins to see past the exit of tunnel 46. Thus, in some embodiments the headlights of vehicle 42 would remain on even though characteristic 49 indicates that field of view 44 does not see a tunnel.

In another embodiment of the present invention, there is an electrical circuit that places the air conditioning system in a recirculating mode when the vehicle is within a tunnel. Thus, air within the vehicle could be recirculated prior to entering the tunnel, thus minimizing the ingestion within vehicle 42 of polluted air within tunnel 42. In this embodiment, the air conditioner is returned to a non-recirculating mode as vehicle 42 approaches the exit of the tunnel, or has left the tunnel.

Figures 4A, 4B:
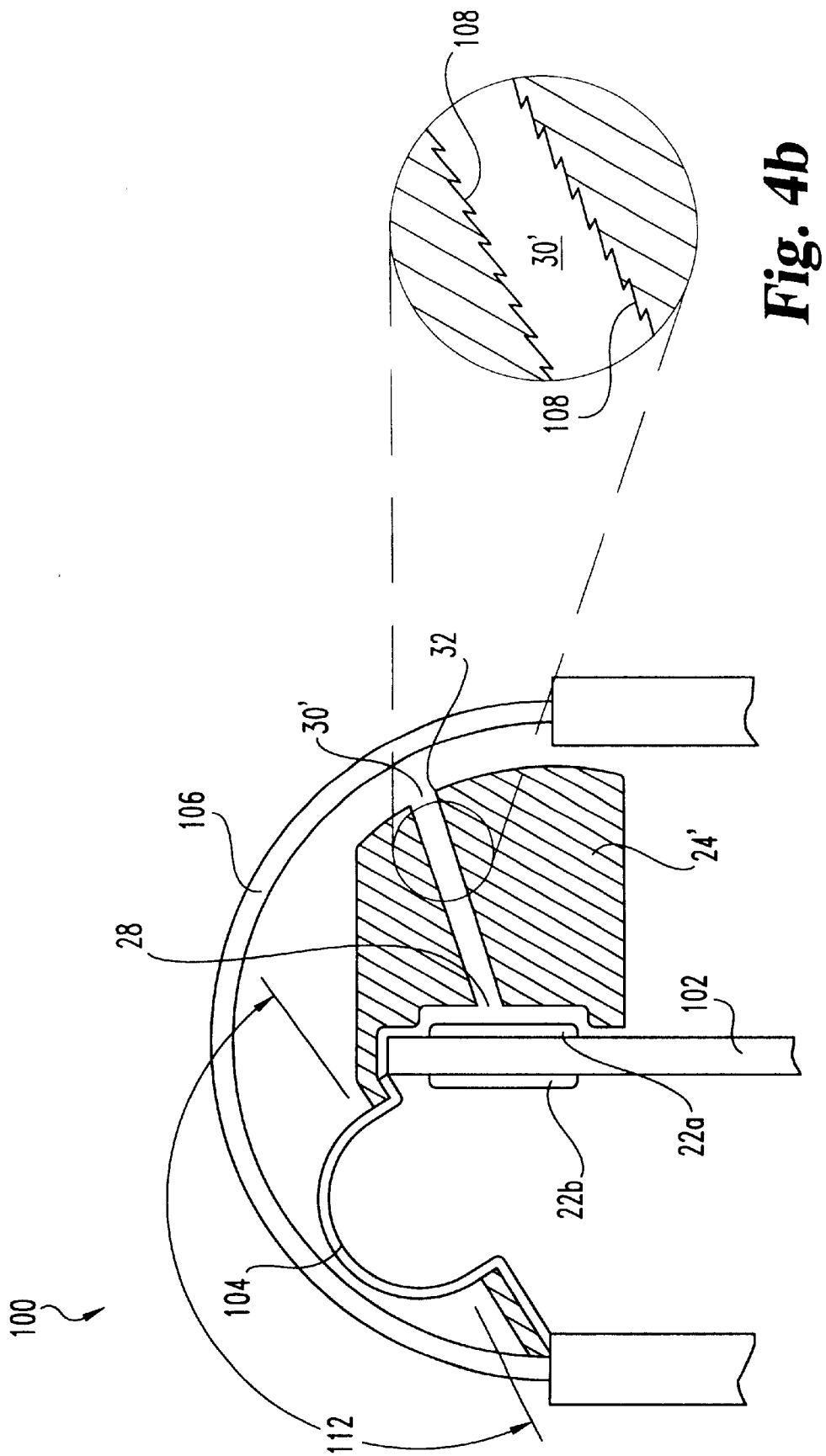
FIG. 4A is a cross-sectional schematic of another embodiment of the present invention.
FIG. 4B is an enlargement of a portion of the channel of the apparatus of FIG. 4A.

FIG. 4a a cutaway of a schematic representation of another embodiment the present invention. FIG. 4b is a closeup of a portion of a channel from FIG. 4A. Apparatus 100 includes photosensors 22a and 22b located on opposite sides of a circuit card 102. The electrical lead wires for photosensors 22 are carried along circuit card 102. Circuit card 102 preferably includes various buffer amplifiers, filters, and digital devices to process the outputs of photosensors 22.

Ambient light enters first opening 32, travels through passageway 30' and second opening 28, and falls incident upon photosensor 22a. Passageway 30', defined within housing 24', includes an upper wall 34, lower wall 36, and sidewalls 33 and 35. The present invention also contemplates a channel 30' with parallel walls, and also contemplates cylindrical pathways and conical pathways. Ambient light also passes through diffuser 104 and falls incident upon second photosensor 22b. A substantially translucent or transparent cap 106 provides light to both aperture 32 and diffuser 104, and also protects the components located therein. In one embodiment of the present invention, diffuser 104 is generally hemispherical in shape, and provides a generally hemispherical field of view 112 to photosensor 22b. However, diffuser 104 is optional, and some embodiments of the present invention do not include a diffuser to provide light to photosensor 22b.

Photosensor 22a, which has light directed to it by passageway 30', responds in a manner like that of photosensor 22 of apparatus 20, including the detection of tunnels ahead of a vehicle. In some embodiments of the present invention channels 30 or 30' incorporate a plurality of ridges or cogs 108 which are useful for reducing the amount of internal reflection of light on the internal walls of channels 30 and 30'. However, other embodiments of the present invention include polishing of the inner surfaces of channels 30 or 30'.

Apparatus 100 also includes photosensor 22b for detecting the amount of ambient light present, and turning on the headlights of a vehicle 42 as dusk or darkness approaches. Filter diffuser 104 provides a field of view 112 to photosensor 22b, that is wider than the field of view of photosensor 22a.

By incorporating both photosensors 22a and 22b in the same apparatus, it is possible to reduce the size and cost of apparatus 100 relative to the size and cost of providing two separate sensors. In addition, the response from one of the photosensors can be used to modify the response of the other photosensor. For example, the amount of light received by ambient light photosensor 22b can be used to modify the response of tunnel photosensor 22a, thus making photosensor 22a more sensitive or less sensitive as a function of the amount of ambient light.

Electrical signal characteristic 113 of FIG. 3 shows a response of photosensor 22b as vehicle 42 drives toward, in, and out of tunnel 46. Because filter diffuser 104 provides wide field of view 112 to sensor 22b, there is little response by sensor 22b to tunnel 46 until vehicle 42 is relatively close to the entrance of tunnel 46, such as position 54. In the vicinity of the entrance to tunnel 46 electrical characteristic 113 begins to change as increasing amounts of field of view 112 are exposed to the decreasing amounts of ambient light within tunnel 46. However, because of wide field of view 112 this change in electrical characteristic 112 does not occur at position 52.

In some embodiments of the present invention electrical characteristic 113 can be modified to produce a signal that responds more slowly. By way of example only, characteristic 113 could be provided to a low pass filter or to a timing circuit. The resultant signal, which is a variation of characteristic 113 that is less sensitive, could be used to turn on the headlights of vehicle 42, change the recirculation state of the air conditioner of vehicle 42, or effect some other system of vehicle 42 sensitive to tunnels.

Characteristic 113 with or without a low pass filter or timing circuit, could be used to modify the system control circuitry which uses characteristic 49 as an input. For example, the reduction in characteristic 112 noted at position 54 could be logically ANDed with characteristic 49 at position 54 to turn on the headlights. In some embodiments of the present invention the combination of photosensors 22a and 22b are useful for preventing the turn on of the vehicle's headlights when the vehicle is in a short tunnel or on a bridge. For example, the ability of photosensor 22a to see ahead and above of the vehicle results in a change in electrical characteristic 49 when the exit of the tunnel is seen by sensor 22a. This change can be used to override a headlight on signal which results from the simultaneous perception by sensor 22b of the interior of the tunnel.

FIG. 5 is a cross-section of a schematic representation of a another embodiment of the present invention. Apparatus 200 includes photosensors 22a and 22b located on circuit card 102". Circuit card 102" differs from circuit card 102 in that photosensors 22a and 22b are located on the same side of circuit card 102". Those of ordinary skill in the art will recognize that the present invention also contemplates those circuit card arrangements in which photosensor 22b is located on a separate circuit card, and also those embodiments in which photosensor 22b has an angular inclination relative to photosensor 22a.

Photosensor 22a receives ambient light directed through a pathway 30" within housing 24" in a matter as previously described. Circuit card 102 also includes a photosensor 22b which receives ambient light through a filter diffuser 104" in a manner as previously described. A cap 106" provides protection for elements of apparatus 200 located therein. Apparatus 200 differs from apparatus 100 in that field of view 112" is generally in the same direction as field of view 44, and that field of view 112" is less than field of view 112. Field of view 112" is at least about a quarter of a spherical view.

Figure 6:
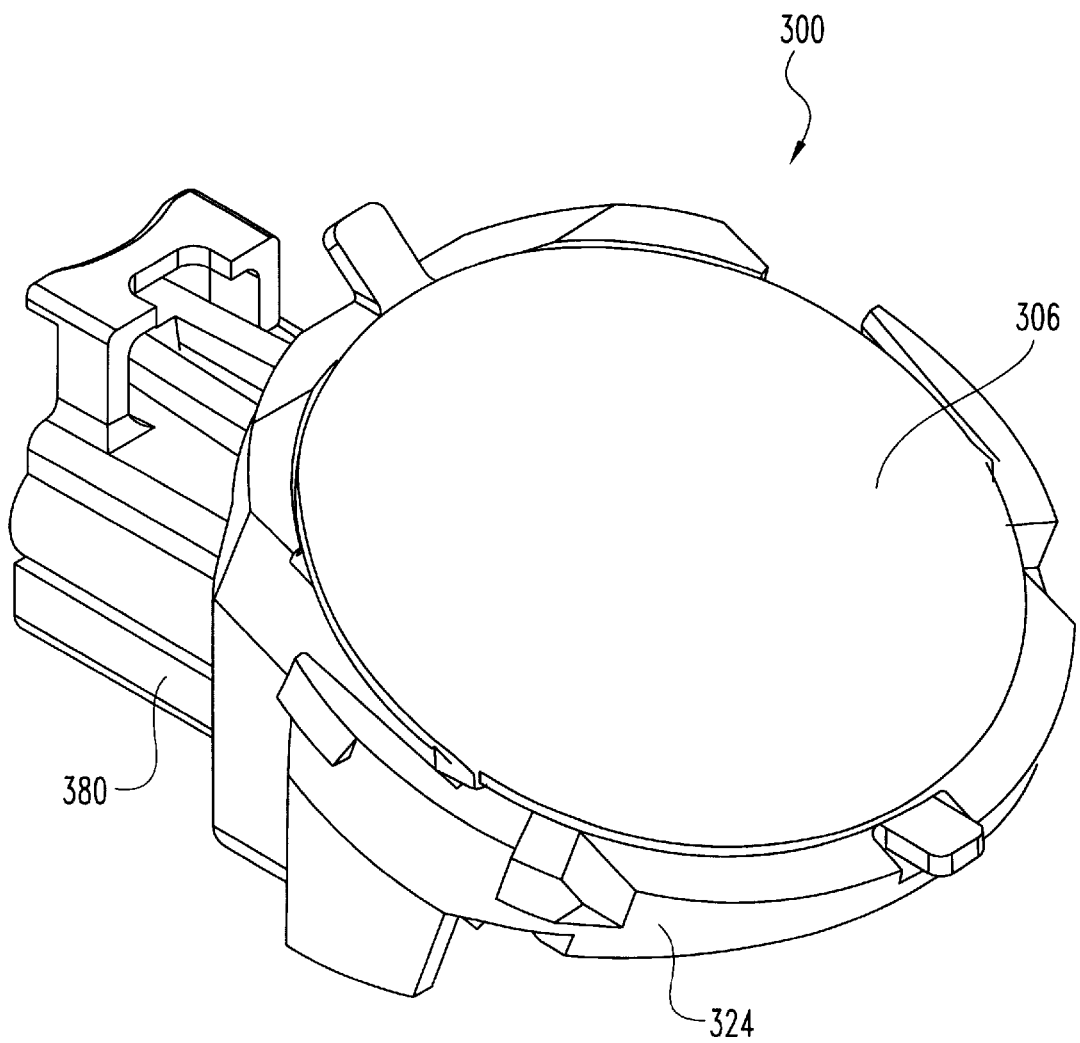
FIG. 6 is a perspective view of an apparatus according to another embodiment of the present invention.
Figure 7:
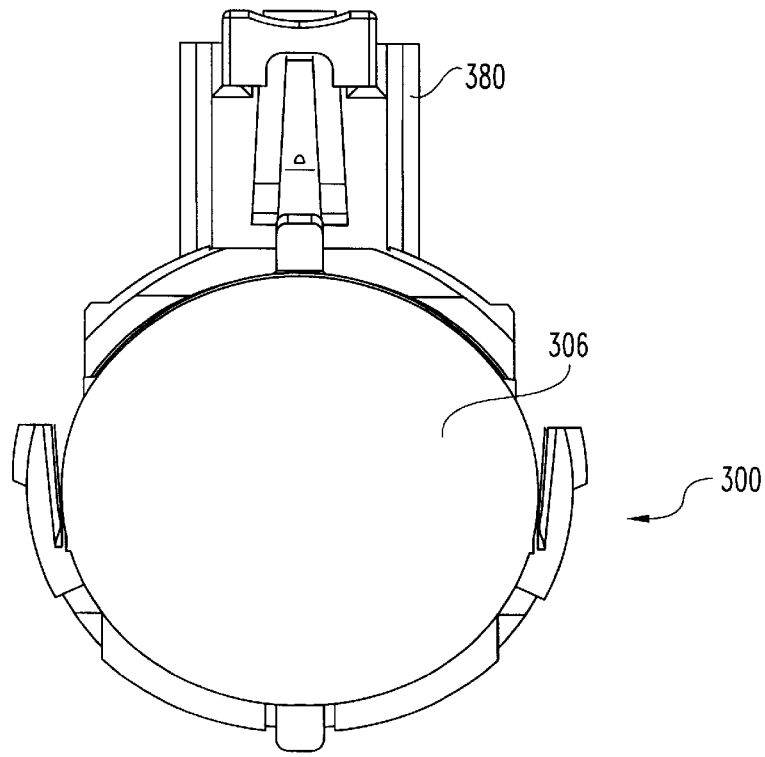
FIG. 7 is a top plan view of the apparatus of FIG. 6.
Figure 8:
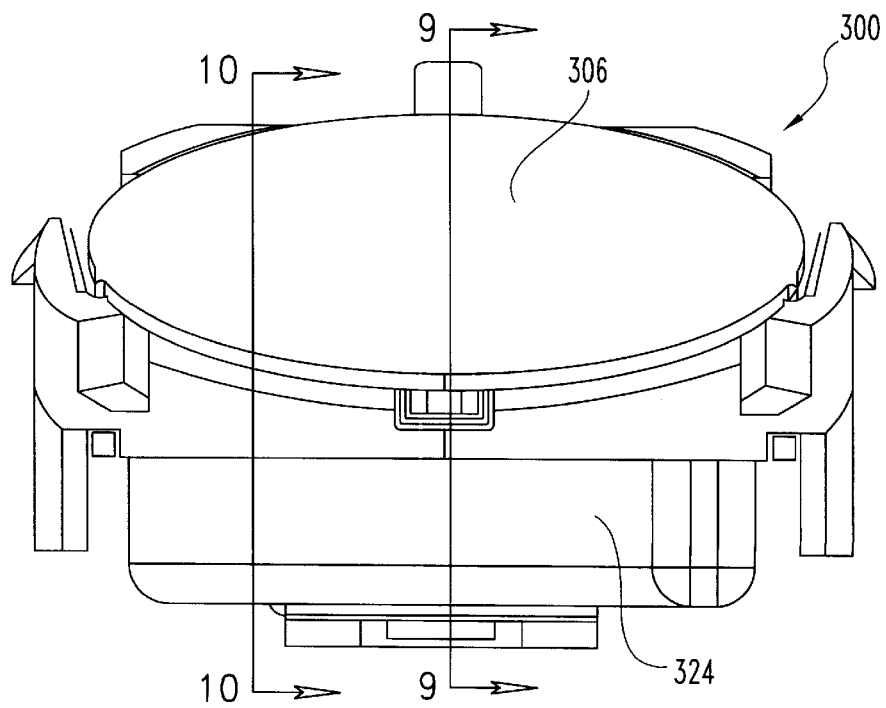
FIG. 8 is a front elevational view of the apparatus of FIG. 6.

FIGS. 6–12 depict another embodiment of the present invention. External views of an apparatus 300 are shown in FIGS. 6–8. Apparatus 300 incorporates a first photodiode 22a constructed and arranged so as to detect tunnel thresholds in a first, narrower field of view and photodiode 22b for detecting ambient light in a second, wider field of view. Apparatus 300 includes a cover 306 which is generally transparent to the radiation of interest, a housing 324, and a rear body 380. Apparatus 300 is generally arranged so as to be placed in an automobile near the rearview mirror of the front windshield. Cover 306 provides a view of the surroundings to photosensors 22a and 22b through the windshield. Those of ordinary skill in the art will recognize the construction, arrangement, and placement of apparatus 300 in other positions of a vehicle such that a view of approaching tunnel thresholds and surrounding ambient light is provided.

Figure 9:
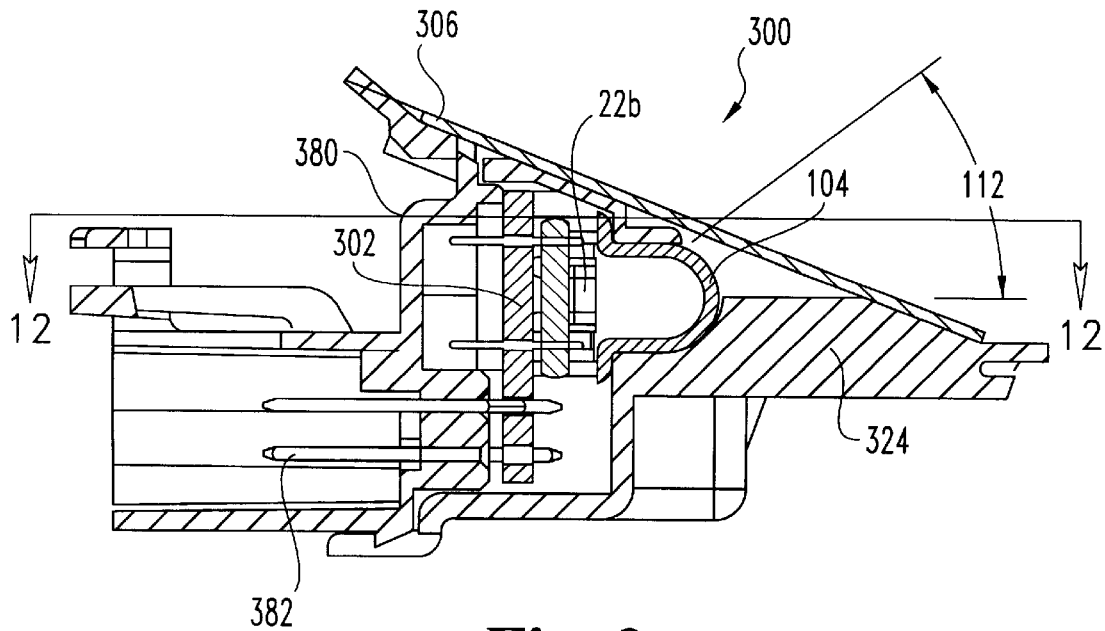
FIG. 9 is a cross-sectional view of the apparatus of FIG. 8 as taken through line 9—9 of FIG. 8.
Figure 10:
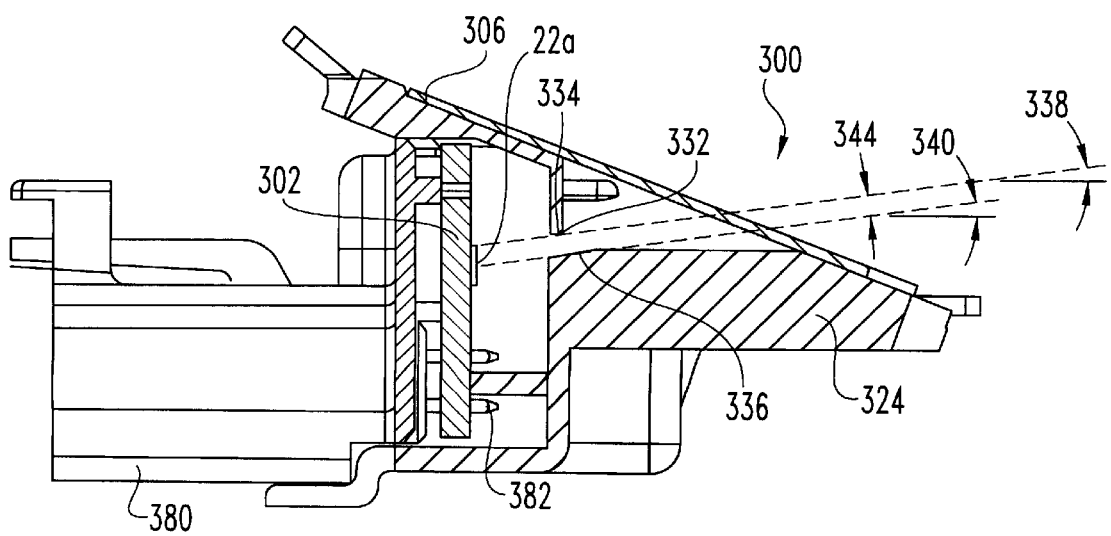
FIG. 10 is a cross-sectional view of the apparatus of FIG. 8 as taken through line 10—10 of FIG. 8.

FIGS. 9 and 10 depict cross-sectional views of apparatus 300 through lines 9—9 and 10—10, respectively, of FIG. 8. As best seen in FIG. 9, second photosensor 22b is mounted to a circuit card 302. Circuit card 302 includes types of circuitry as described for circuit card 102. Light passing through cover 306 and hemispherical diffuser 104 falls incident upon photosensor 22b, resulting in an electrical signal therefrom. Diffuser 104 provides a field of view 112 that is generally broader than the field of view provided to photodiode 22a in both azimuth and elevation.

The output of photosensor 22b is used as both a solar sensor and a twilight sensor. The electrical output of photosensor 22b is provided a first amplification which results in a first amplified electrical signal and is used as a solar sensor. This first signal is provided, for example, to the controller of the air conditioning system which uses the first amplified electrical signal for adjusting the heating or cooling of the passenger compartment of the vehicle. In one embodiment the first amplification is a factor of about 3.7 million.

The first amplified signal is then provided a second amplification to result in a second amplified signal which is the twilight signal 112 as discussed herein. This twilight signal is more amplified so as to permit detection of lower levels of light. The second amplification is a factor of about 80 over the first amplification, for a total amplification of about 300 million. In a preferred embodiment of apparatus 300, electrical components for providing both the first amplification and the second amplification are attached to circuit card 302. A plurality of pins 382 provide various electrical signals from circuit card 302 to various controllers of the vehicle.

FIG. 10 depicts a section of apparatus 300 showing first photosensor 22a. Photosensor 22a is mounted to circuit card 302, where its electrical characteristics may be modified by various circuitry as described herein for circuit card 102. Electrical signals from photosensor 22a are provided to various controllers through pins 382.

Light received through an elevational field of view 344 and azimuthal field of view 31 falls incident upon photosensor 22a. A lower wall 336 defined by housing 324 establishes a lower optical path inclined relative to the horizontal by angle 340. An accented edge 332 defined within housing 324 in conjunction with the upper edge of the receiving surface of photodiode photosensor 22a define an upper optical path inclined relative to the horizontal by angle 338. Angles 338 and 340 are preferably greater than about 2 degrees and preferably less than about 65 degrees. In one most preferred embodiment angles 340 and 338 are each about 7 degrees, thus establishing the upper and lower optical paths as being approximately parallel. Upper wall 334, unlike wall 34 of channel 30, does not limit field of view 344 beyond the limitation provided by accented edge 332. Instead, upper wall 334 is approximately parallel to the horizontal but may also be inclined away from the upper optical path so as to not interfere therewith.

Figure 12:
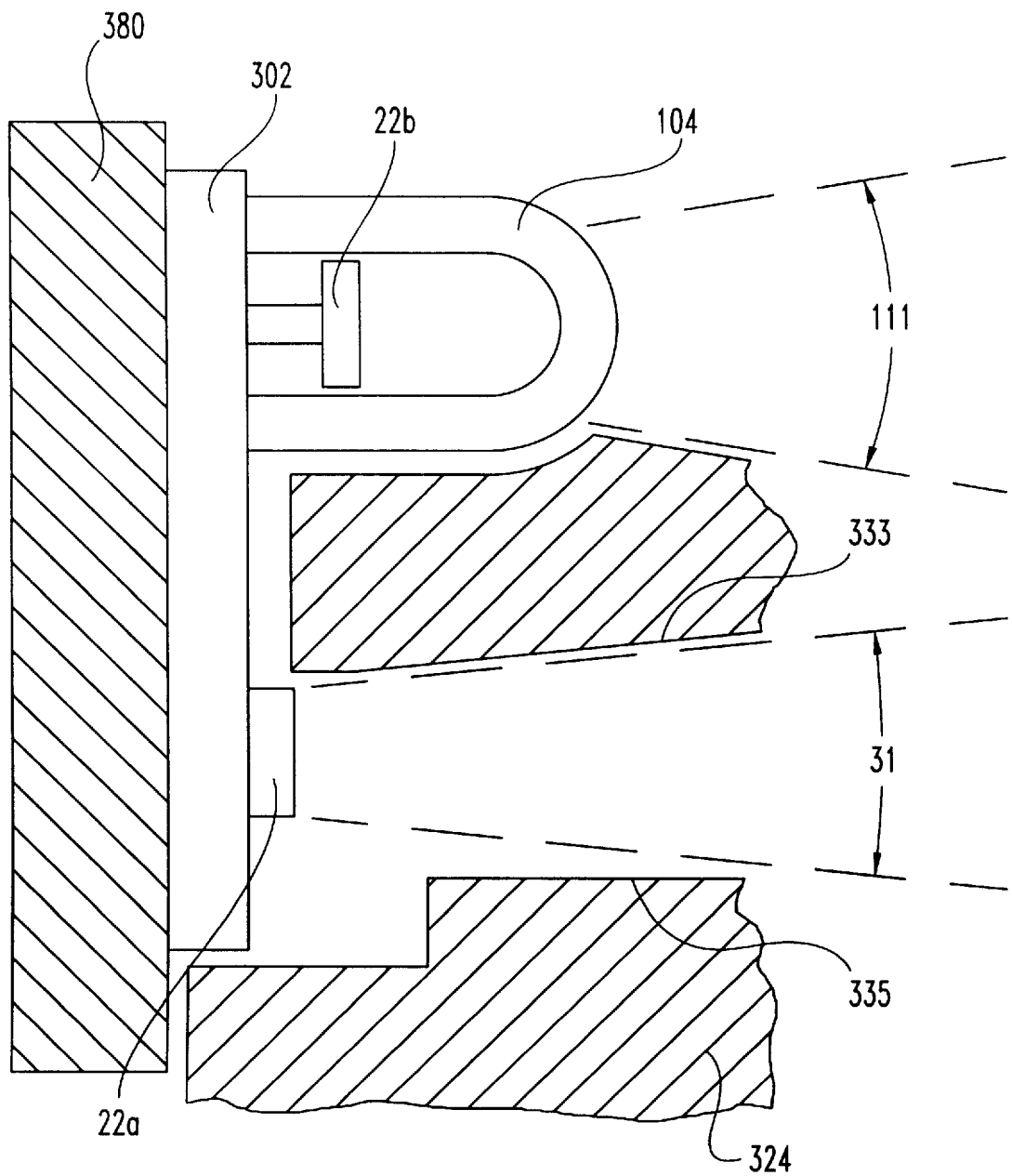
FIG. 12 is a cross-sectional partial schematic representation of the apparatus of FIG. 9 as taken along line 12—12 of FIG. 9.

In one embodiment of the present invention, the distance from the receiving surface of photosensor 22a to corner 332 of upper wall 334 is about 0.2 inches. The distance from corner 332 to lower wall 336 is about 0.04 inches. The azimuthal viewing path, as best seen in FIG. 12, is defined by a minimum width of about 0.13 inches. The active receiving area of photodiode 22a is about 0.044 inches by 0.044 inches.

FIG. 12 is a partial schematic representation of a cross-section of apparatus 300 as viewed from line 12—12 of FIG. 9. Photosensors 22b and 22a are shown mounted generally side by side on circuit card 302. Hemispherical diffuser 104 provides light from an azimuthal field of view 111 that is wider than the azimuthal field of view 31 of photosensor 22a. Sidewalls 333 and 335 of housing 324 generally establish field of view 31. However, those of ordinary skill in the art will recognize that a sidewall is not necessary to define the field of view, provided that an accented edge or aperture is used. Photosensors 22b and 22a are preferably optically isolated from each other and receive incident radiation substantially from only their respective fields of view.

Figure 11:
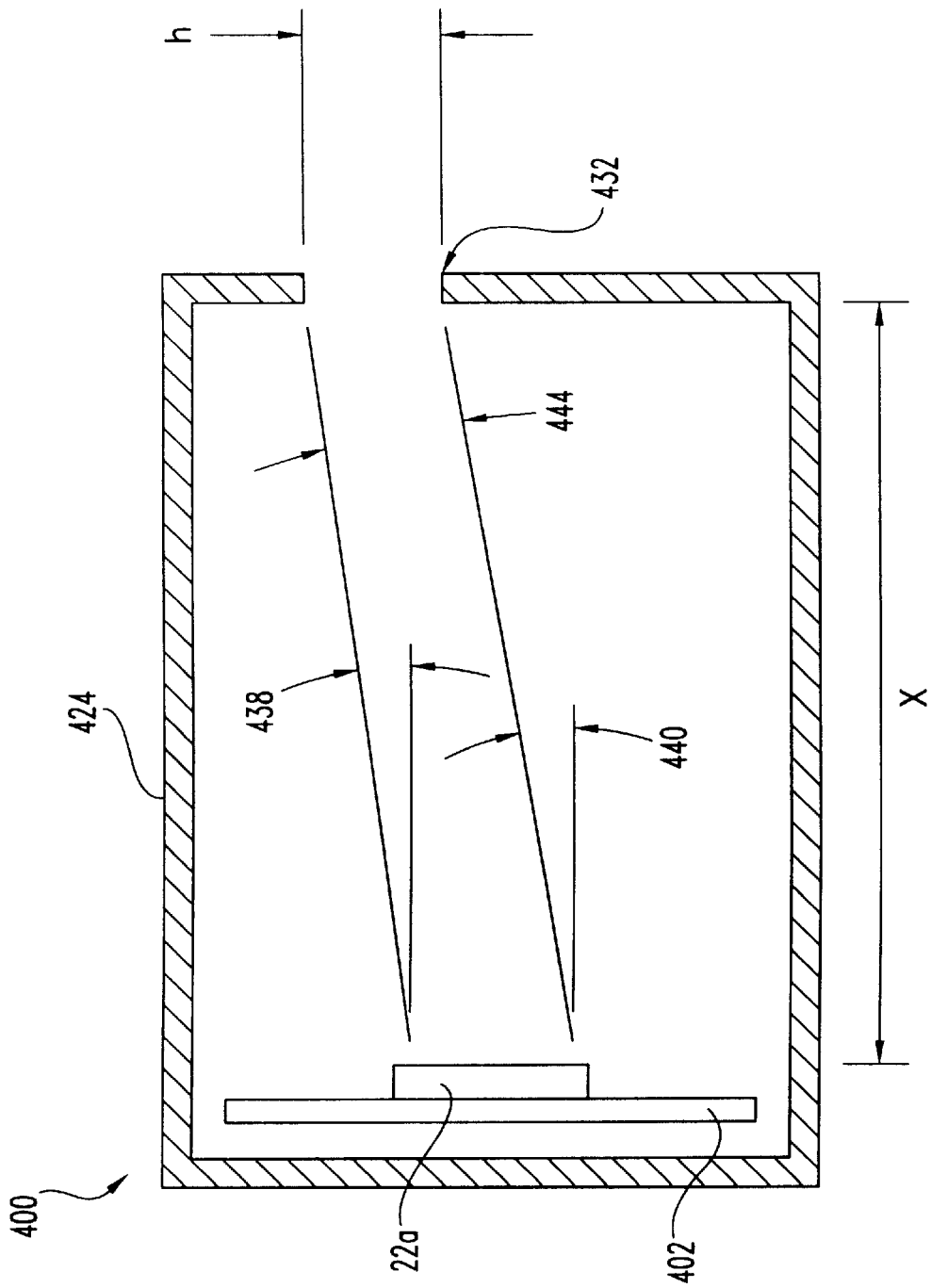
FIG. 11 is a schematic representation of an apparatus according to another embodiment of the present invention.

FIG. 11 schematically represents yet another embodiment of the present invention. A photosensor 22a is mounted to a circuit card 402 within a housing 424. Photosensor 22a receives radiation through a field of view 444 established by the placement of sensor 22a relative to an aperture 432. The upper optical path is established by placing the upper edge of aperture 432 at an angle 438 relative to the upper edge of the active receiving area of sensor 22a and relative to the horizontal. The lower optical path is established by placing the lower edge of aperture 432 at an angle 440 relative to the lower boundary of the receiving area of photosensor 22a and relative to the horizontal. Angles 438 and 440 are preferably greater than about 2 degrees and preferably less than about 65 degrees. Most preferably, angles 438 and 440 are about 7 degrees. The distance x from the receiving area of photosensor 22a to the aperture in one preferred embodiment, is about 0.2 inches. The height h of aperture 432 in that embodiment is about 0.044 inches. The width of aperture 432 in that embodiment is about 0.13 inches. As seen in FIG. 11, it is not necessary to have a channel to provide light from the outer aperture to the photosensor. By so inclining the lower and upper optical paths, a portion of aperture 32 and 432 is above photosensor 22a.

For those embodiments having both photosensors 22a and 22b, the solar signal or twilight signal from sensor 22b can be used to modify the response of a vehicle system to the approach of a tunnel. For example, for ambient conditions of generally low light, the headlights of the vehicle can be made to turn on sooner than for a bright day. On a bright day the headlights would be actuated after a first period of time after indication by tunnel sensor 22a of a tunnel entrance. On a darker day, the headlights would be actuated after a second period of time after indication by the tunnel sensor 22a of a tunnel entrance, the second period being shorter than the first period. Those of ordinary skill in the art will be able to determine the appropriate difference between the first period and second period based on their understanding of their customers preferences.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    a photosensor for sensing ambient light;
    a housing; and
    a channel defined within said housing for providing light to said photosensor, said channel having an upper wall, a lower wall, and two sidewalls;
    wherein the lower wall is inclined more than about two degrees above the horizontal, the upper wall is inclined less than about sixty five degrees above the horizontal, and the included angle between said sidewalls is more than about two degrees and less than about ninety degrees.

2. The apparatus of claim 1, wherein said photosensor provides a first electrical signal in response to light from said channel, and which further comprises a vehicle with actuatable lights and a controller, said controller actuating said lights in response to said first electrical signal.

3. The apparatus of claim 2, wherein said first electrical signal changes in response to said vehicle approaching a tunnel and before said vehicle enters the tunnel.

4. The apparatus of claim 2, wherein said vehicle includes an actuatable recirculating air conditioning system, and said air conditioning system recirculates in response to said first electrical signal.

5. The apparatus of claim 2, which further includes a second photosensor with a second electrical signal responsive to ambient light received thereon, said second photosensor receiving light from a second field of view that is at least one quarter of a spherical view, wherein said controller receives said first electrical signal and said second electrical signal and actuates said lights in response thereto.

6. The apparatus according to claim 5, wherein said channel provides ambient light to said photosensor from above and ahead of said vehicle, and restricts ambient light to said photosensor from behind said vehicle.

7. The apparatus according to claim 1, wherein said channel provides ambient light to said photosensor from above and ahead of said vehicle, and restricts ambient light to said photosensor from behind said vehicle.

8. The apparatus according to claim 7, wherein said channel provides a field of view to said photosensor that is biased to provide more light from one of the left side of said vehicle or the right side of said vehicle and less from the other side of said vehicle.

9. The apparatus according to claim 7, wherein at least one of said walls of said channel includes a plurality of ridges for reducing reflection of light.

10. The apparatus according to claim 7, wherein said photosensor is a photodiode with a radiation receiving surface that generally faces to the front of the vehicle.

11. An apparatus comprising:
a vehicle;
a housing mounted on said vehicle;
a first aperture defined within said housing;
a second aperture defined within said housing;
a photosensor receiving ambient light from said second aperture; and
a channel defined within said housing for transmitting light to said photosensor, said channel having a lower wall with a portion of said lower wall inclined more than about two degrees above the horizontal, said channel having two ends, said channel having said first aperture at one end and said second aperture at the other end;
wherein a portion of said first aperture is above said second aperture, and said channel provides a field of view to said photosensor that is above and ahead of said vehicle.

12. The apparatus according to claim 11, wherein said photosensor provides a first electrical signal in response to light from the field of view, and which further comprises a vehicle with actuatable lights and a controller, said controller actuating said lights in response to said first electrical signal.

13. The apparatus of claim 12, wherein said vehicle includes an actuatable recirculating air conditioning system, and said air conditioning system recirculates in response to said first electrical signal.

14. The apparatus of claim 12, wherein said first electrical signal changes in response to said vehicle approaching a tunnel and before said vehicle enters the tunnel.

15. The apparatus of claim 14, which further includes a second photosensor with a second electrical signal responsive to ambient light received thereon, said second photosensor receiving light from a second field of view larger than the first field of view, wherein said controller receives said first electrical signal and said second electrical signal and actuates said lights in response thereto.

16. The apparatus of claim 11, wherein said channel restricts ambient light to said photosensor from behind said vehicle.

17. The apparatus of claim 16, wherein said channel includes sidewalls, and the included angle between said sidewalls is more than about two degrees and less than about ninety degrees.

18. A method for detecting a tunnel over a vehicle roadway, comprising:
providing a channel in optical communication with a photosensor, the channel being within a housing mounted on a vehicle;
orienting the channel such that a portion of the channel generally faces ahead of the vehicle and generally faces above the vehicle;
restricting light to the photosensor from behind the vehicle;
permitting light to enter the channel and fall incident upon the photosensor; and
measuring a change in the electrical characteristics of the photosensor when the vehicle approaches a tunnel.

19. The method according to claim 18, wherein said orienting provides a restricted field of view with a bottom that is inclined at least about two degrees above the horizontal, and less than about sixty five degrees above the horizontal.

20. The method of claim 19, wherein said providing includes actuatable headlights for the vehicle, and which further comprises responding to said measuring by actuating the headlights of the vehicle before the vehicle crosses a threshold of the tunnel.

21. The method according to claim 18, wherein said providing includes actuatable headlights for the vehicle, and which further comprises responding to said measuring by actuating the headlights of the vehicle before the vehicle crosses a threshold of the tunnel.

22. The method of claim 21, wherein the vehicle includes an actuatable recirculating air conditioning system, and, which further comprises recirculating the air conditioning system in response to said measuring.

23. An apparatus for a vehicle for sensing ambient light, comprising:
a housing;
a first photosensor with a first electrical signal in response to ambient light incident thereon;
a channel defined within said housing for providing ambient light in a first field of view to said first photosensor; and
a second photosensor with a second electrical signal in response to ambient light incident thereon, said second photosensor being provided ambient light in a second field of view, the second field of view being larger than the first field of view;
wherein said channel provides a field of view to said first photosensor that is generally above and ahead of said vehicle.

24. The apparatus of claim 23 wherein said second field of view is generally hemispherical.

25. The apparatus of claim 23 wherein said second field of view is at least one quarter of a spherical view.

26. The apparatus according to claim 25, which further comprises a vehicle with actuatable lights and a controller, said controller actuating said lights in response to said first electrical signal, wherein said first electrical signal changes in response to said vehicle approaching a tunnel and before said vehicle enters the tunnel.

27. The apparatus according to claim 19, which further comprises a vehicle with actuatable lights and a controller, said controller actuating said lights in response to said first electrical signal and said second electrical signal.

28. The apparatus according to claim 27, wherein said first electrical signal changes in response to said vehicle approaching a tunnel and before said vehicle enters the tunnel.

29. The apparatus according to claim 27, wherein said vehicle includes an actuatable recirculating air conditioning system, and said air conditioning system recirculates in response to said first electrical signal and said second electrical signal.

30. The apparatus according to claim 27, wherein said channel restricts ambient light to said first photosensor from behind said vehicle.

31. The apparatus according to claim 30, wherein said channel includes a lower wall, and said lower wall is inclined more than about two degrees above the horizontal.

32. The apparatus according to claim 31, wherein said channel provides a first field of view to said photosensor that is biased to provide more light from one of the left side of said vehicle or the right side of said vehicle and less from the other side of said vehicle.

33. An apparatus for detecting a tunnel over a roadway, comprising:
a vehicle for travelling on the roadway;
a photosensor for sensing ambient light, said photosensor providing a changeable electrical signal in response to the ambient light;

a housing mounted on said vehicle; and a channel defined within said housing for providing ambient light to said photosensor, said channel having two side walls and a lower wall;

wherein the lower wall is inclined above the horizontal, and said side walls define an angle therebetween, and the angle is greater than about two degrees and less than about ninety degrees, and said electrical signal changes in response to said vehicle approaching the tunnel.

34. The apparatus according to claim 33, wherein said vehicle includes actuatable lights and which further comprises a controller, said controller actuating said lights in response to the change in said electrical signal.

35. The apparatus according to claim 34, wherein said channel defines a first field of view, and which further includes a second photosensor with a second changeable electrical signal in response to ambient light, said second photosensor receiving ambient light from a second field of view larger than the first field of view, wherein said controller receives said first electrical signal and said second electrical signal and actuates said lights in response thereto.

36. The apparatus of claim 35, wherein said second field of view is at least one quarter of a spherical view.

37. The apparatus of claim 34, wherein said channel provides ambient light to said photosensor from above and ahead of said vehicle, and restricts ambient light to said photosensor from behind said vehicle.

38. An apparatus for a vehicle for sensing ambient light, comprising:

a vehicle with actuatable headlights;

a housing mounted on said vehicle;

a first photosensor providing a first electrical signal responsive to ambient light received thereon;

an aperture defined within said housing for providing ambient light in a first field of view to said first photosensor, the first field of view being generally above and ahead of said vehicle, the first field of view restricting light to said first photosensor from behind said vehicle, the field of view having a top inclined less than about sixty five degrees above the horizontal; and a controller for actuating said headlights, said controller receiving said first electrical signal and actuating said headlights in response thereto.

39. The apparatus of claim 38 wherein said first electrical signal changes in response to said vehicle approaching a tunnel and before said vehicle enters the tunnel.

40. The apparatus of claim 39, wherein said vehicle includes an actuatable recirculating air conditioning system, and said air conditioning system recirculates in response to said first electrical signal.

41. The apparatus of claim 38 which further includes a second photosensor with a second electrical signal, said second photosensor receiving light from a second field of view larger than the first field of view, wherein said controller receives said first electrical signal and said second electrical signal and actuates said headlights in response thereto.

42. The apparatus of claim 38, wherein the field of view through said aperture has a bottom, and the bottom is inclined at least about two degrees above the horizontal and less than about sixty five degrees above the horizontal.

43. The apparatus of claim 42, wherein said first photosensor is a photodiode with a radiation receiving surface that generally faces to the front of the vehicle.

44. The apparatus according to claim 43, which further includes a second photosensor with a second electrical signal responsive to ambient light received thereon, said second photosensor receiving light from a second field of view larger than the first field of view, wherein said controller receives said first electrical signal and said second electrical signal and actuates said headlights in response thereto.

45. The apparatus of claim 44, wherein the second field of view is at least one quarter of a spherical view.

46. An apparatus comprising:

a vehicle having a front and a rear;

a housing mounted on said vehicle;

an aperture defined within said housing; and a photosensor receiving ambient light from said aperture, said aperture limiting light received by said photosensor from the rear of said vehicle;

wherein said aperture provides a field of view to said photosensor that is above and ahead of said vehicle, and the field of view through said aperture has a bottom and the bottom is inclined at least about two degrees above the horizontal, and less than about sixty five degrees above the horizontal.

47. The apparatus of claim 46 wherein the field of view through said aperture has a bottom and the bottom is inclined at least about two degrees above the horizontal, and less than about sixty five degrees above the horizontal.

48. The apparatus according to claim 47, wherein said aperture provides a field of view to said photosensor that is biased to provide more light from one of the left side of said vehicle or the right side of said vehicle and less from the other side of said vehicle.

49. The apparatus of claim 47, wherein said photosensor provides a first electrical signal in response to light from the field of view, and which further comprises a vehicle with actuatable lights and a controller, said controller actuating said lights in response to said first electrical signal, and wherein said first electrical signal changes in response to said vehicle approaching a tunnel and before said vehicle enters the tunnel.

50. The apparatus of claim 46, wherein said photosensor provides a first electrical signal in response to light from the field of view, and which further comprises a vehicle with actuatable lights and a controller, said controller actuating said lights in response to said first electrical signal.

51. The apparatus according to claim 50, wherein said first electrical signal changes in response to said vehicle approaching a tunnel and before said vehicle enters the tunnel.

52. The apparatus according to claim 50, wherein said vehicle includes an actuatable recirculating air conditioning system, and said air conditioning system recirculates in response to said electrical signal.

53. The apparatus according to claim 50, which further includes a second photosensor with a second electrical signal responsive to ambient light received thereon, said second photosensor receiving ambient light from a second field of view larger than the first field of view, wherein said controller receives said first electrical signal and said second electrical signal and actuates said lights in response thereto.

54. The apparatus of claim 53, wherein the second field of view is at least one quarter of a spherical view.

55. A method for detecting a tunnel over a vehicle roadway, comprising:

providing an aperture in optical communication with a photosensor, the aperture being within a housing mounted on a vehicle with actuatable headlights;

orienting the aperture in front of the photosensor such that the aperture provides a field of view to the photosensor that generally faces ahead of the vehicle and generally faces above the vehicle;

permitting light to enter the aperture and fall incident upon the photosensor;

measuring a change in the electrical characteristics of the photosensor when the vehicle approaches a tunnel; and responding to said measuring by actuating the headlights of the vehicle before the vehicle crosses a threshold of the tunnel.

56. The method of claim 55 wherein said orienting provides a restricted field of view with a bottom that is inclined at least about two degrees above the horizontal, and less than about sixty five degrees above the horizontal.

57. The method according to claim 56, which further comprises restricting light to the photosensor from behind the vehicle.

58. The method The apparatus according to claim 57, wherein said providing includes an actuatable recirculating air conditioning system for the vehicle, and which further comprises responding to said measuring by recirculating the air conditioning system of the vehicle before the vehicle crosses a threshold of the tunnel.

59. The method The apparatus of claim 55, which further comprises restricting light to the photosensor from behind the vehicle.

60. An apparatus for a vehicle for sensing ambient light, comprising:

a housing with a front and a rear;

a first photosensor providing a first electrical signal in response to ambient light incident thereon;

an aperture defined within said housing for providing ambient light in a first field of view to said first photosensor; and a second photosensor providing a second electrical signal in response to ambient light incident thereon, said second photosensor being provided ambient light in a second field of view, the second field of view being larger than the first field of view;

wherein said aperture provides a first field of view to said first photosensor that is generally above and ahead of the housing and inclined above the horizontal.

61. The apparatus of claim 60 wherein the first field of view has a bottom and the bottom is inclined more than about two degrees above the horizontal and the first field of view has a top and the top is inclined less than about sixty five degrees above the horizontal.

62. The apparatus of claim 61 which further comprises a diffuser for providing light to said second photosensor.

63. The apparatus according to claim 62 wherein said first filed of view has a horizontal field of view that includes an angle of more than about two degrees and less than about ninety degrees.

64. The apparatus according to claim 63 wherein said aperture is biased to provide more light from one of the left side of said vehicle or the right side of said vehicle and less from the other side of said vehicle.

65. The apparatus according to claim 63, wherein said first photosensor is positioned rearward of said aperture.

66. The apparatus according to claim 63 which further comprises a circuit card, wherein said first photosensor and said second photosensor are mounted to said circuit card.

67. The apparatus according to claim 63, wherein said housing includes a plurality of ridges for reducing reflection of light in the first field of view.

68. The apparatus according to claim 63 wherein the second field of view is at least one quarter of a spherical view.

69. The apparatus of claim 60 wherein the first field of view has a bottom and the bottom is inclined more than about two degrees above the horizontal.

70. The apparatus of claim 60 wherein the first field of view has a top and the top is inclined less than about sixty five degrees above the horizontal.

71. The apparatus according to claim 60 wherein said aperture provides a horizontal field of view that includes an angle of more than about two degrees and less than about ninety degrees.

72. An apparatus for a vehicle for sensing ambient light, comprising:

a vehicle with an actuatable recirculating air conditioning system;

a photosensor providing an electrical signal responsive to ambient light received thereon, said photosensor receiving light from a field of view generally above and ahead of said vehicle, the field of view restricting light to said photosensor from behind said vehicle; and a controller receiving said electrical signal and capable of actuating said recirculating air conditioning system in response thereto;

wherein said electrical signal changes in response to a threshold of a tunnel passing through the field of view, and said controller actuates said system to recirculate before said vehicle crosses the threshold in response to the change in said electrical signal.

73. The apparatus according to claim 72 wherein said vehicle includes actuatable lights, said controller is capable of actuating said lights, and said controller actuates said lights in response to the change in said electrical signal.

74. The apparatus according to claim 72 wherein the field of view to said photosensor is biased to provide more light from one of the left side of said vehicle or the right side of said vehicle and less from the other side of said vehicle.

75. The apparatus of claim 72 wherein the field of view has a bottom and the bottom is inclined more than about two degrees above the horizontal.

76. The apparatus of claim 72 wherein the field of view has a top and the top is inclined less than about sixty five degrees above the horizontal.

77. The apparatus of claim 72 which further includes a second photosensor providing a second electrical signal responsive to ambient light received thereon, said second photosensor receiving light from a second field of view larger than the first field of view, wherein said controller receives said first electrical signal and said second electrical signal and actuates said system to recirculate in response thereto.

78. An apparatus for detecting a tunnel over a roadway, comprising:

a housing with a front and a rear, said housing defining an aperture; and a photosensor receiving ambient light from said aperture, said aperture limiting light received by said photosensor toward the rear of said housing;

wherein said photosensor and said aperture are spaced apart such that said aperture provides a field of view to said photosensor that is toward the front of said housing and above said housing, the field of view through said aperture has a bottom and the bottom is inclined at least about two degrees above the horizontal, and less than about sixty five degrees above the horizontal.

79. The apparatus according to claim 78 wherein said photosensor has a horizontal field of view through said aperture that includes an angle of more than about two degrees and less than about ninety degrees.

80. The apparatus of claim 78 wherein the field of view has a top, and the top is inclined less than about sixty five degrees above the horizontal.

81. The apparatus according to claim 78, wherein said aperture provides a field of view to said photosensor that is biased to provide more light from one of the left side of the roadway or the right side of the roadway and less from the other side of the roadway.

82. The apparatus according to claim 81, wherein said photosensor is positioned rearward of said aperture.

83. The apparatus according to claim 82, wherein said housing includes a plurality of ridges for reducing reflection of light.

84. The apparatus of claim 78, wherein said photosensor provides an electrical signal in response to light from the field of view, and said electrical signal changes in response to the entrance of the tunnel moving into the field of view and before said housing passes through the tunnel entrance.

85. The apparatus according to claim 78, wherein said housing defines a second field of view, and which further includes a second photosensor receiving ambient light through the second field of view, the second field of view being larger than the first field of view.

86. The apparatus according to claim 85 wherein the second field of view provides ambient light from a direction toward the front of said housing.

87. The apparatus according to claim 86 wherein the second field of view is at least one quarter of a spherical view.

88. A method for detecting a tunnel over a vehicle roadway, comprising:

providing an aperture in optical communication with a photosensor, the aperture being within a housing;

orienting the aperture such the aperture provides a field of view to the photosensor which generally faces ahead of the housing and generally faces above the housing, the field of view being inclined above the horizontal;

restricting light to the photosensor from behind the housing;

permitting light to enter the aperture and fall incident upon the photosensor; and providing a change in the electrical characteristics of the photosensor when the housing approaches a tunnel.

89. The method according to claim 88, wherein said providing includes an actuatable recirculating air conditioning system for the vehicle, and which further comprises responding to the change in electrical characteristics by recirculating the air conditioning system of the vehicle before the vehicle crosses a threshold of the tunnel.

90. The method according to claim 88, wherein said orienting provides a field of view with a bottom that is inclined at least about two degrees above the horizontal, and less than about sixty five degrees above the horizontal.

91. The method of claim 88, wherein said providing includes actuatable headlights for the vehicle, and which further comprises responding to the change in electrical characteristics by actuating the headlights of the vehicle before the vehicle crosses a threshold of the tunnel.

* * * * *